United States Patent [19]

Seretny et al.

[11] 4,124,785
[45] Nov. 7, 1978

[54] TELEPHONE SET

[75] Inventors: Stanley E. Seretny; Carl E. Webb, both of Indianapolis, Ind.

[73] Assignee: Bell Telephone Laboratories, Incorporated, Murray Hill, N.J.

[21] Appl. No.: 877,597

[22] Filed: Feb. 14, 1978

Related U.S. Application Data

[63] Continuation of Ser. No. 660,324, Feb. 23, 1976.

[51] Int. Cl.² .................... H04M 1/03; H04M 1/23
[52] U.S. Cl. ............................. 179/103; 179/90 K; 179/167; 179/178; 179/179; 200/159 A
[58] Field of Search ............... 200/159 A, 294, 295, 200/296, 328, 340; 339/17 R, 17 M, 17 N; 179/1 C, 2 C, 90 R, 90 D, 90 K, 100 R, 100 D, 100 L, 103, 107 R, 107 E, 178, 179, 184, 185, 186, 187, 188, 158, 167

[56] References Cited

U.S. PATENT DOCUMENTS

| T880,003 | 11/1970 | Spahn | 179/107 R |
|---|---|---|---|
| 3,035,211 | 5/1962 | Mitchell | 179/90 K |
| 3,123,676 | 3/1964 | Prescott et al. | 179/103 |
| 3,235,674 | 2/1966 | Mirstam | 179/103 |
| 3,243,527 | 3/1966 | Sternheim | 179/185 |
| 3,476,886 | 11/1969 | Ferrari et al. | 179/103 |
| 3,586,806 | 6/1971 | Swisher | 200/294 |
| 3,627,930 | 12/1971 | Tolman | 179/100 R |
| 3,641,286 | 2/1972 | Berezowski | 179/90 K |
| 3,668,356 | 6/1972 | Kekas | 200/340 |
| 3,830,988 | 8/1974 | Mol et al. | 179/187 |
| 3,845,253 | 10/1974 | Hanneman et al. | 179/179 |
| 3,924,090 | 12/1975 | Chao et al. | 200/159 A |
| 3,941,951 | 3/1976 | Engstrom et al. | 179/179 |
| 3,969,600 | 7/1976 | Sims | 200/159 B |
| 4,029,915 | 6/1977 | Ojima | 200/340 |

FOREIGN PATENT DOCUMENTS 1,372,895  1/1964  France ................................. 179/103

OTHER PUBLICATIONS

F. Brandstetter and H. Greska; "Seimens Masterset III, A New Desk Telephone"; Seimens Review No. 5; May 1974; pp. 201-203.

Primary Examiner—William C. Cooper
Assistant Examiner—Randall P. Myers
Attorney, Agent, or Firm—Harry L. Newman

[57] ABSTRACT

A telephone set includes a unified internal chassis having individual cup portions for accommodating a transmitter and receiver. Each of these transducers is captured within its associated cup portion by a retaining member that is disposed about the perimeter of the transducer and the perimeter of the cup portion. A dial, which is mechanically and electrically separate from telephone network circuitry contained on a printed circuit, is secured to the chassis by fasteners, and the securing of the dial to the chassis serves to electrically connect the dial to the proper conductive paths of the speech network circuitry. The printed circuit and the components soldered thereto are only supported on the chassis by means of fastening devices and therefore the printed circuit is also readily disassembled from the chassis.

5 Claims, 8 Drawing Figures

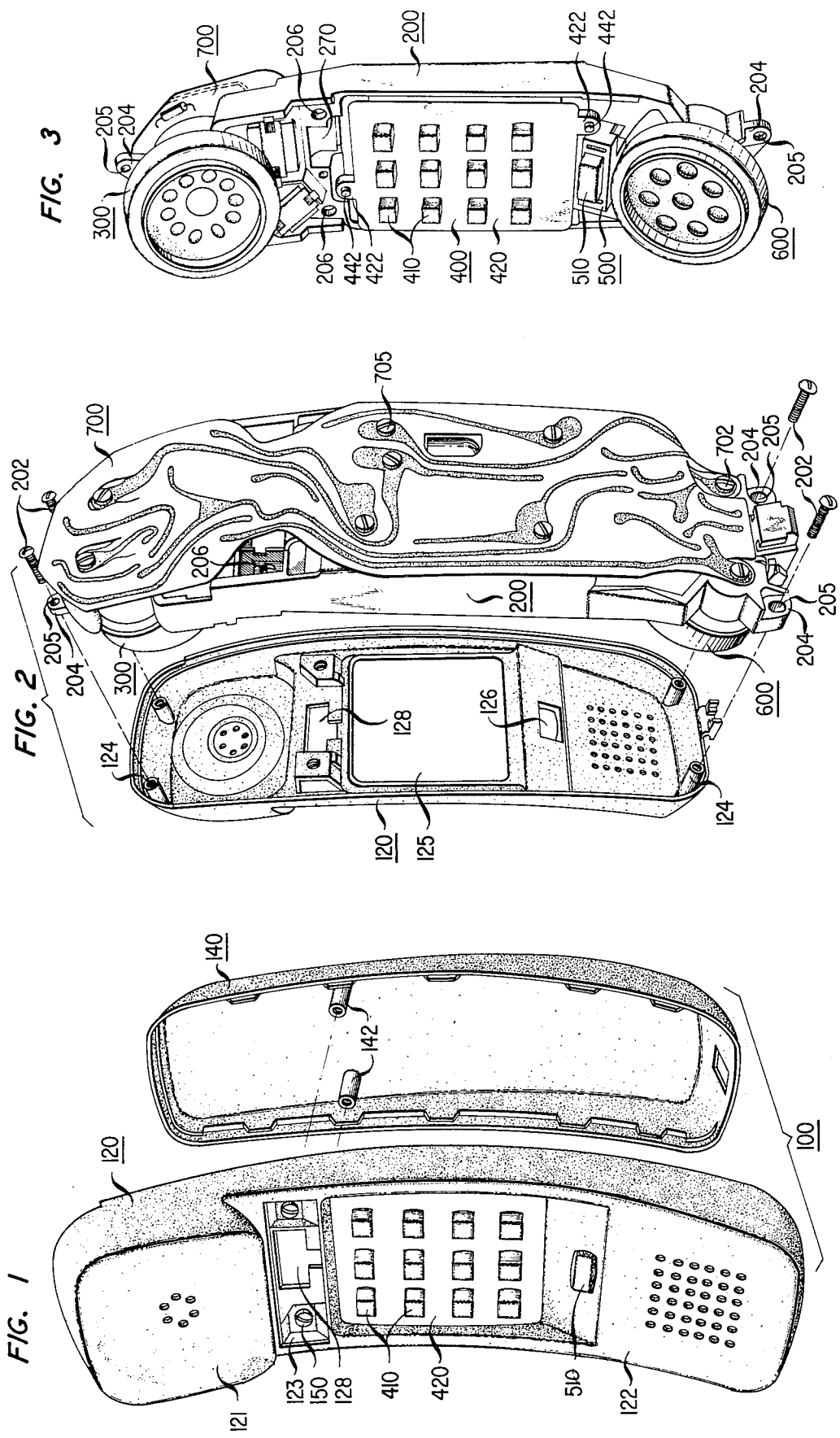

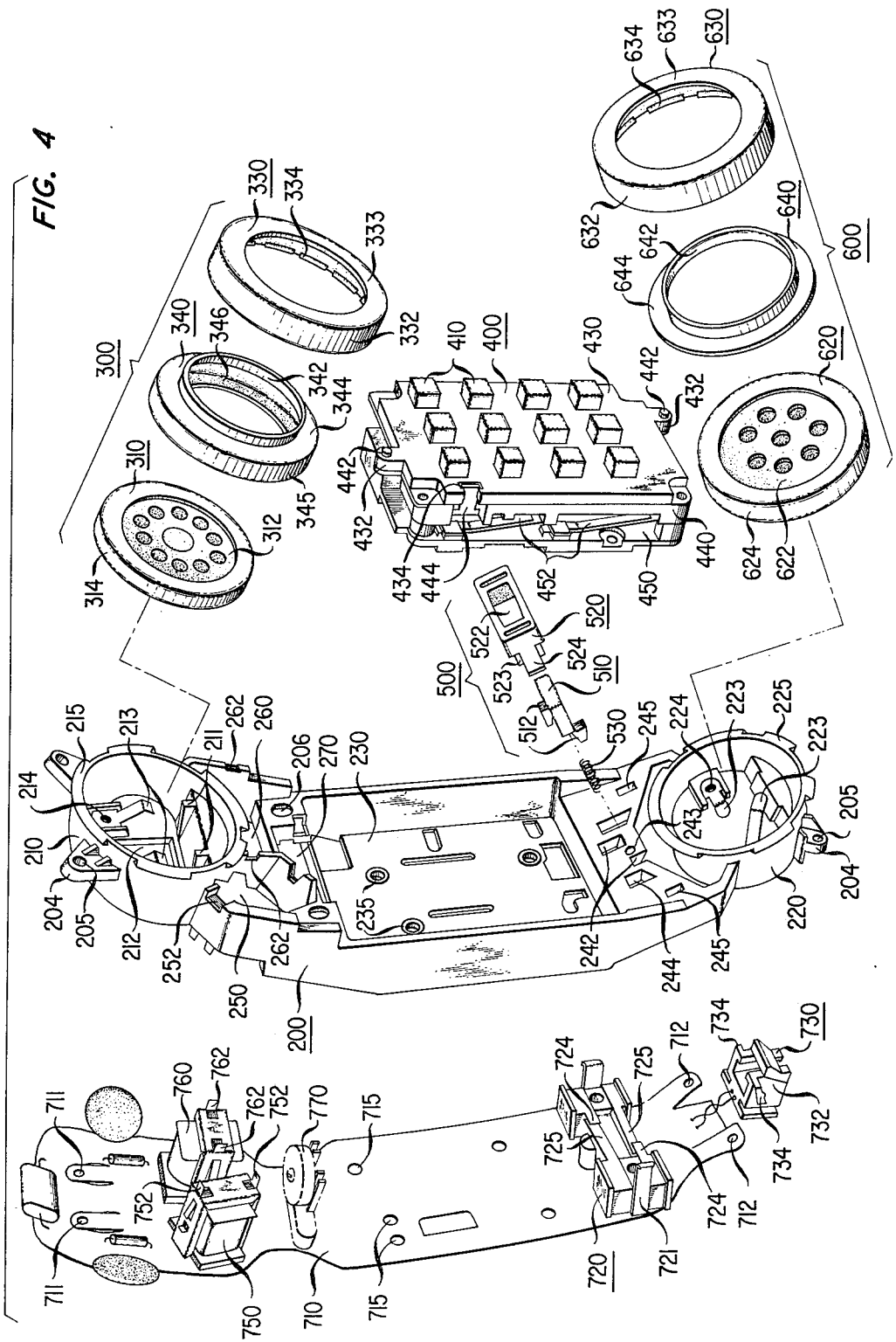

TELEPHONE SET

CROSS REFERENCE TO RELATED APPLICATION

This application is a continuation of our copending application, Ser. No. 660,324, filed Feb. 23, 1976.

FIELD OF THE INVENTION

This invention relates to the field of telephony, and within that field to the design of telephone sets.

BACKGROUND OF THE INVENTION

Dial-in-handset telephones are now well known in the art. As disclosed in an article entitled "The Evolution of a Telephone" published in the January 1966 issue of the *Bell Laboratories Record*, the handset of such telephones incorporates the transmitter, receiver, dial, and the entire speech network. This is in contrast to the more conventional arrangement in which the handset proper only incorporates the transmitter and receiver, the dial and the speech network being mounted within a separate base or stand. In addition, the dial in dial-in-handset telephones is advantageously illuminated by means of a lamp and light guide.

The inclusion of all these elements in the handset, while at the same time keeping the handset small enough to be comfortably supported in a person's hand, results in a structure that is fairly complex. The challenge, therefore, is to arrange and support these components in a manner that not only facilitates their assembly during the manufacture of the set, but also facilitates their disassembly when maintenance or replacement of components is necessary.

DESCRIPTION OF THE PRIOR ART

U.S. Pat. No. 3,627,930 issued to W. R. Tolman on Dec. 14, 1971, discloses a dial-in-handset structure that advances toward this goal. This handset includes a pushbutton dial assembly incorporating a recall switch that is used to interrupt the telephone line in order to obtain dial tone without having to operate a switchhook in the base. A pair of brackets respectively fastened to the sides of the dial assembly extend longitudinally outward from the dial proper and support a transmitter cup at one end thereof. The dial assembly includes frequency and common switches, while the underside of the transmitter cup includes a jack having a plurality of contacts.

A flexible printed circuit, which includes both the speech network and the dial circuitry, extends the length of the handset behind these components and is soldered to the frequency and common switches of the dial assembly and the contacts of the jack. In addition, the flexible circuit is soldered to the terminals of an integrated circuit that is accommodated within a recess in the underside of the dial assembly. Finally, the flexible circuit is also soldered to the terminals of a lamp socket and transformer that are respectively accommodated within individual portions of a receiver cup located at the end of the flexible circuit opposite to the transmitter cup.

The foregoing components form an integrated unit that is fastened to the inside surface of a top housing portion or deck by six screws, two of which secure the receiver cup in place and the balance of which secure the dial brackets in place. Further, the transmitter and receiver cups when so fastened respectively serve to retain and make electrical contact with a transmitter and receiver captured between the cups and the deck, while a light guide that also serves as the dial faceplate is captured between the dial assembly and the deck. Two additional screws secure a bottom housing portion or shell to the deck to complete the handset.

From the above it is seen that the integrated unit formed by the dial assembly, brackets, transmitter and receiver cups, and flexible circuit is not rigid. The only structural connection between the receiver cup and the remainder of the components is by way of the flexible circuit, structural rigidity between these two portions being provided by the deck. Thus when the integrated unit is detached from the deck, such as when either the unit or the deck requires maintenance, if care is not exercised in providing support for both portions of the unit, the flexible circuit may be damaged by the flopping around of one of the portions.

In addition, when the integrated unit is detached from the deck, the transmitter and receiver are loose piece parts. Thus the deck, besides providing structural rigidity, is also needed to secure working components of the handset in place. Consequently, the working components of the handset cannot be shipped in assembled form without the deck. However, the deck, being part of the housing, comes in many different colors. With the working components of the handset tied to the deck, it is necessary for telephone companies to inventory the working components, which are the same irrespective of the color of the housing, on a one to one basis with the housing.

Another drawback of this arrangement is that the dial is not an independent entity. It is not complete until the dial assembly and the integrated circuit are soldered to the flexible circuit. Consequently, the dial cannot be tested until that process is completed. Should replacement of the dial become necessary, it cannot be done by an installer in the field. Furthermore, if the recall switch fails, it is necessary to disassemble the dial in order to replace the switch.

Still another disadvantage of this arrangement is the number of fasteners needed to secure the integrated unit to the deck. Each additional fastener increases the time required to assemble the handset initially and to disassemble and reassemble the handset if maintenance subsequently becomes necessary. Finally, by using the light guide as the faceplate of the dial, the light guide is subject to wear that degrades its performance and thereby shortens its life.

SUMMARY OF THE INVENTION

The telephone set of the present invention is designed to overcome the disadvantages of the just described set. The telephone set includes a rigid internal chassis having integral individual cup portions at the ends thereof for accommodating the transmitter and receiver. Each of these transducers is captured within its associated cup portion in engagement with contacts contained therewithin by an annular retaining ring that is disposed about both the perimeter of the cup portion and the perimeter of the transducer.

The pushbutton dial is an independent entity that is mechanically and electrically separate from both the recall switch and the speech network circuitry, the latter being contained on a flexible printed circuit. A light guide is disposed about the buttons of the dial and a metal faceplate overlies the light guide. The dial is secured to the chassis by fasteners, and the securing of the dial to the chassis serves to electrically connect the dial to the proper conductive paths of the speech network circuitry.

The recall switch is soldered to the speech network printed circuit and snap-mounted to the chassis, while a recall button assembly for actuating the recall switch is also snap-mounted to the chassis. Similarly, the contacts of a jack for accommodating a plug-ended handset cord include leads that are soldered to the network printed circuit, while the jack itself is snap-mounted to the underside of the transmitter cup portion. Other components soldered to the network printed circuit are also snap-mounted to the chassis and/or include tabs that are bent over to secure the components to the chassis. The only other connection of the network printed circuit to the chassis is by way of screws that both fasten the printed circuit to the chassis and electrically connect conductive paths on the printed circuit to the receiver, transmitter, and dial.

All of the foregoing components when joined together form a complete working handset that is independent of the housing, the deck and shell basically serving as a decorative enclosure for this internal handset. Furthermore, this integral handset is secured to the deck by four screws, the shell when secured to the deck clamping a portion of the chassis therebetween.

Because the chassis provides a rigid support for the speech network flexible printed circuit, the printed circuit is not subject to extreme bending when the internal handset is separated from the housing. Furthermore, because the internal handset is complete, it can be tested at the time of manufacture and shipped to the telephone companies separate from the color significant housing. The installer can then carry a complete color line of housings, which are relatively inexpensive, for each internal handset, which is relatively expensive, and assemble the color housing selected by the subscriber at the time the telephone is installed. This reduces the inventory that the telephone company need maintain of the expensive component assemblies, thereby saving money.

Because the pushbutton dial is an independent entity, it can be tested separately from the other components of the handset, and it can be used in other types of telephone sets. In addition, because it is mechanically secured and electrically connected by simple fasteners, it can be easily replaced by an installer in the field.

Finally, the fewer fasteners needed to secure the internal handset within the housing simplifies assembly and maintenance of the handset, and the use of a metal faceplate over the light guide protects the light guide from wear.

BRIEF DESCRIPTION OF THE DRAWING

FIG. 1 is an exploded perspective view showing the front of the handset with the shell separated from the handset;

FIG. 2 is an exploded perspective view looking from the back of the handset with the shell removed and showing the internal handset separated from the deck;

FIG. 3 is a front perspective view of the internal handset;

FIG. 4 is an exploded perspective view showing the transmitter assembly, receiver assembly, dial assembly, recall button assembly, chassis, and printed circuit assembly separated from one another;

DETAILED DESCRIPTION

Figure 5:
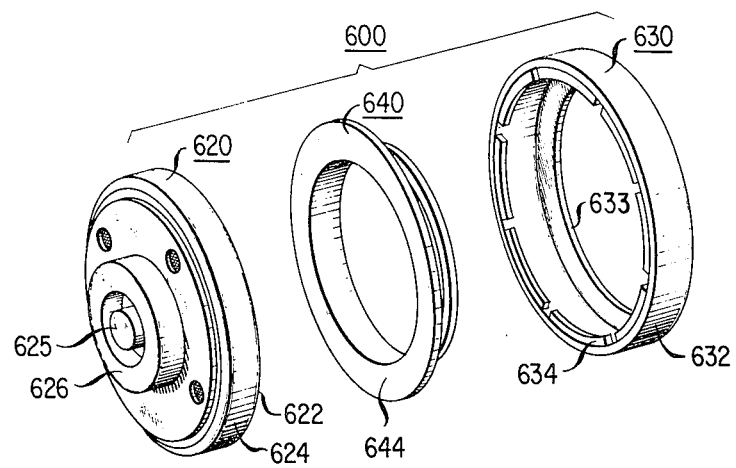
FIG. 5 is an exploded perspective view looking from the rear showing the transmitter and the gasket and retaining ring that secure the transmitter to the chassis.

Referring to FIG. 1 of the drawing, a telephone handset in accordance with the present invention includes a housing 100 comprising a deck 120 and a shell 140. The deck 120, which serves as the face of the handset, is shaped to incorporate an earpiece 121 at one end thereof and a mouthpiece 122 at the other end thereof. The deck 120 includes a rectangular cavity 123 adjacent to the earpiece 121 having an opening 128 and a pair of screws 150 disposed adjacent to the sides of the opening. The screws 150, which are normally concealed by a number card and a cover plate (not shown), thread into posts 142 of the shell 140 to fasten the deck 120 to the shell. Details with respect to the number card and the cover plate and the manner in which the deck and shell are joined together are set forth in U.S. Pat. No. 3,400,226 issued to C. L. Krumreich and E. A. Mills on Sept. 23, 1968.

Referring now also to FIGS. 2 and 3, captured between the deck 120 and the shell 140 is a molded rigid chassis 200 to which a receiver assembly 300, a dial assembly 400, a recall button assembly 500, a transmitter assembly 600, and a printed circuit assembly 700 are secured. The chassis 200 together with the component assemblies secured thereto forms a working internal handset that is physically independent of the housing 100 in that the housing serves as an ornamental enclosure rather than providing structural support for the components.

The chassis 200 and thereby this internal handset is secured to the deck 120 by two pairs of screws 202. The heads of the screws 202 engage integral tab portions 204 at the receiver and transmitter ends of the chassis 200, and the shafts of the screws pass through openings 205 in the tab portions and thread into posts 124 of the deck. In addition, the screws 150 that secure the deck 120 to the shell 140 pass through openings 206 in the chassis 200, and when the deck and shell are fastened together, the portion of the chassis surrounding the openings 206 is clamped between the underside of the deck and the ends of the posts 142 of the shell.

When the chassis 200 is secured to the deck 120, the dial assembly 400 underlies a large rectangular opening 125 in the deck. The dial assembly 400 includes an array of pushbuttons 410 that extend into the opening 125 and a metal faceplate 420 that serves as a bottom closure for the opening. Similarly, the recall button assembly 500 underlies a small rectangular opening 126 in the deck 120 and includes a pushbutton 510 that extends into that opening.

Turning next to FIG. 4, the chassis 200 includes an integral receiver cup portion 210 at one end thereof and an intergral transmitter cup portion 220 at the other end thereof that respectively accommodate terminal portions of a receiver 310 of the receiver assembly 300 and a transmitter 620 of the transmitter assembly 600. The receiver 310 is of the type disclosed in U.S. Pat. No.

3,439,130 issued to A. J. Chase and K. E. Hammer on Apr. 15, 1969, in that it comprises a cylindrical body portion 312 including an annular ferrule 314 disposed about its perimeter, the body portion having on its underside (not shown) a pair of terminals straddling a biasing magnet. The receiver cup portion 210 is of a size that the body portion 312 of the receiver 310 rests on the rim of the cup portion, which is planar, while the magnet and terminals extend within the cup portion.

The cup portion 210 includes a pair of locating ridges 211 on one side thereof and a locating recess 212 in the bottom surface thereof that cooperate with structural aspects of the biasing magnet of the receiver 310 to orient the receiver so that its terminals engage a pair of spaced cantilever spring contacts 213 extending from the bottom of the cup portion. The fixed ends of the spring contacts 213 are respectively secured to the bottom of the receiver cup portion 210 by individual cylindrical eyelets 214 that are threaded internally. The rim of the cup portion 210 has a lip 215 extending outwardly therefrom, and the top surface of the lip lies in the plane of the rim. The outer edge of the top surface of the lip 215 is beveled, and the underside of the lip tapers toward the outer edge.

Figure 6:
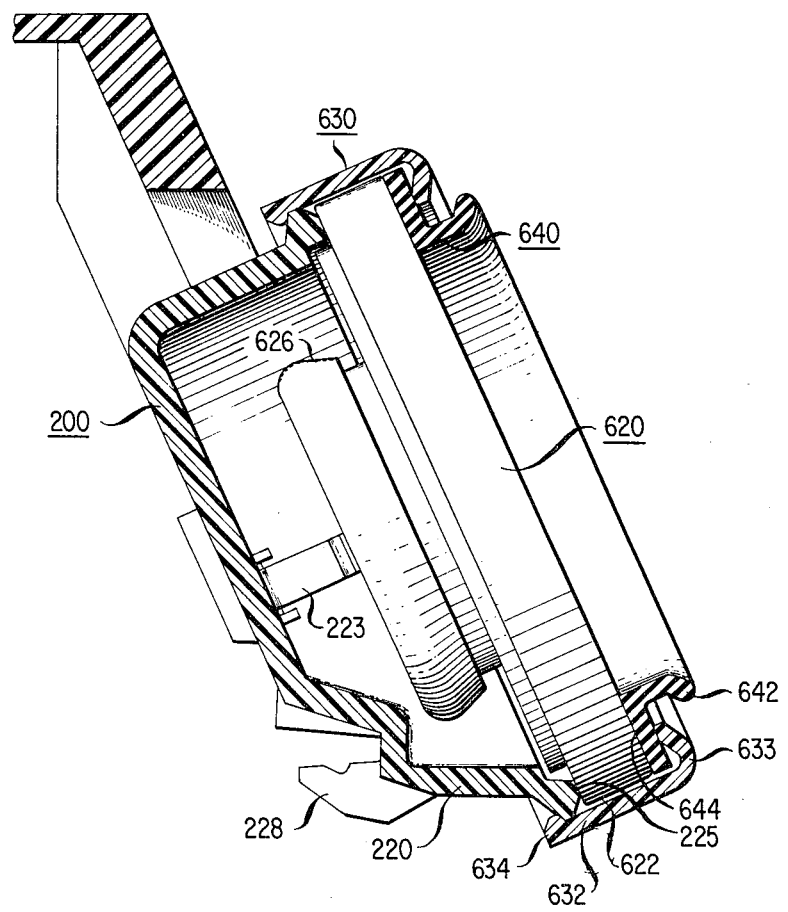
FIG. 6 is a cross sectional view showing the retaining ring, gasket, and transmitter assembled to the chassis.

Referring also to FIGS. 5 and 6, the transmitter 620 comprises a cylindrical body portion 622 including an annular ferrule 624 disposed about its perimeter and having on its underside a center terminal 625 circumscribed by an annular terminal 626. The transmitter cup portion 220 is of a size that the body portion 622 of the transmitter 620 rests on the rim of the cup portion, and except for a step along its inside edge that conforms to a step on the underside of the body portion, the rim lies in a common plane. The terminals 625 and 626 extend within the cup portion 220, and because of the terminal arrangement, no particular orientation is required for the transmitter 620.

The transmitter cup portion 220 includes a pair of spaced cantilever spring contacts 223 that extend from the bottom of the cup portion so that the free ends thereof respectively engage the terminals 625 and 626 of the transmitter 620. Like the spring contacts 213 of the receiver cup portion 210, the fixed ends of the spring contacts 223 are respectively secured to the bottom of the transmitter cup portion 220 by individual cylindrical eyelets 224 that are threaded internally.

The rim of the cup portion 220 has a lip 225 extending outwardly therefrom and the top surface of the lip lies in the plane of the rim. The outer edge of the top surface of the lip 225 is beveled, and the underside of the lip tapers toward the outer edge. When the transmitter 620 is positioned on the cup portion 220, the lip 225 underlies the ferrule 624 and the outer edge of the lip extends just beyond the circumference of the ferrule.

The receiver 310 and transmitter 620 are respectively secured to the receiver and transmitter cup portions 210 and 220 by annular retaining rings 330 and 630, annular gaskets 340 and 640 being respectively captured between the transducers and the retaining rings. The two retaining rings are identical and therefore only the transmitter retaining ring 630 will be described in detail.

The retaining ring 630 comprises a cylindrical wall portion 632 having a lip portion 633 extending inwardly from its front end and a catch portion 634 extending inwardly from its rear end. The inside diameter of the wall portion 632 is slightly greater than the outside diameter of the body portion 622 of the transmitter 620, and the height of the wall portion exceeds the height of the body portion. The lip portion 633 is of a size to essentially overlap the top surface of the ferrule 624 of the transmitter 620, while the catch portion 634 is of a size to slightly overlap the bottom surface of the ferrule. The catch portion 634 comprises an interrupted annular ridge having a generally triangular cross section, the crest of which is rounded.

As indicated above, the gasket 640 is captured between the transmitter 620 and the retaining ring 630 and it includes a crown portion 642 extending from a flange portion 644. The crown portion 642 is of a size to extend within and project beyond the lip portion 633 of the retaining ring 630, and the flange portion 644 is of a size to fit within the wall portion 632 and underlie the lip portion. The gasket 640 is formed from a soft flexible material, such as rubber, while the retaining ring 620 is formed from a flexible material, which can be, for instance, the flame retardant polypropylene, known as Polyflam.

As a result of these relationships, the transmitter assembly 600 is assembled by first positioning the gasket 640 with the flange portion 644 underneath the lip portion 633 of the retaining ring 630 and with the crown portion 642 extending through the opening formed by the lip portion. The body portion 622 of the transmitter 620 is then positioned within the retaining ring 630 by pressing it past the latch portion 634. The transmitter assembly 600 is thereafter secured to the transmitter cup portion 220 of the chassis 200 by pressing down on the lip portion 633 of the retaining ring 630 to snap the catch portion 634 of the ring past the beveled edge of the lip portion 225 of the cup portion.

The height of the wall portion 632 of the retaining ring 630 is selected so that with the catch portion 634 thereof positioned on the underside of the lip portion 225 of the transmitter cup portion 220, the lip portion 633 of the retaining ring presses the flange portion 644 of the gasket against the ferrule 624 of the transmitter 620 to hold the transmitter firmly against the rim of the cup portion. The terminals 625 and 626 of the transmitter 620 are thereby held in engagement with spring contacts 223 extending from the bottom of the cup portion 220, and an acoustic seal is provided between the transmitter and the rim of the cup portion. Furthermore, inasmuch as the crown portion 642 of the gasket 640 protrudes beyond the lip portion 633 of the retaining ring 630, the crown portion is pressed against the inside surface of the deck 120 (FIG. 2) to form an acoustic seal therewith when the internal handset is joined to the deck.

Referring now only to FIG. 4, the receiver assembly 300 is basically the same as the transmitter assembly 600. As stated above, the retaining ring 330 is identical to the retaining ring 630, and therefore it includes a wall portion 332, a lip portion 333, and a catch portion 334. The gasket 340, however, differs from the gasket 640 because the receiver 310 is smaller in diameter than the transmitter 620. As a result, the gasket 340, in addition to having a crown portion 342 and a flange portion 344, also includes a wall portion 345. The wall portion 345 of the gasket 340 extends around the body portion 312 of the receiver 310 to provide the receiver with essentially the same diameter as the transmitter 620. Furthermore, the gasket 340 includes a lip portion 346 that extends beneath the body portion 312 of the receiver 310 to form a tight acoustic seal between the receiver and the receiver cup portion 210.

Other than this, the relationship between the components of the receiver assembly 300 and the manner in which the receiver assembly is secured to the receiver cup portion 210 is essentially the same as described above with respect to the transmitter assembly 600 and the transmitter cup portion 220. The one difference is that the receiver 310 has to be oriented with respect to the receiver cup portion 210 in the manner previously described before the catch portion 334 of the retaining ring 330 is snapped over the beveled edge of the lip portion 215 of the receiver cup portion.

Figure 7:
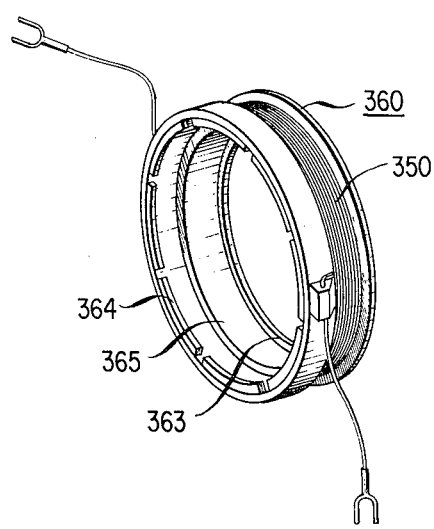
FIG. 7 is a perspective view of a retaining ring including a coil winding.

Because receivers of the type disclosed in the previously referred to A. J. Chase et al. patent do not generate a large stray magnetic field, they pose a problem for people using hearing aids having magnetic telephone pickups. One solution for this problem is to provide a coil that is connected to the terminals of the receiver to generate a magnetic field corresponding to the incoming speech signals. Referring to FIG. 7, such a coil 350 is advantageously wound on a retaining ring 360 including a spool portion 365 in addition to a lip portion 363 and a catch portion 364. The inside surface of the spool portion 365 is of a diameter to conform to the diameter of the receiver 310 and therefore replaces the wall portion 345 of the gasket 340. In all other ways the retaining ring 360 performs in the same manner as the retaining ring 330.

Figure 8:
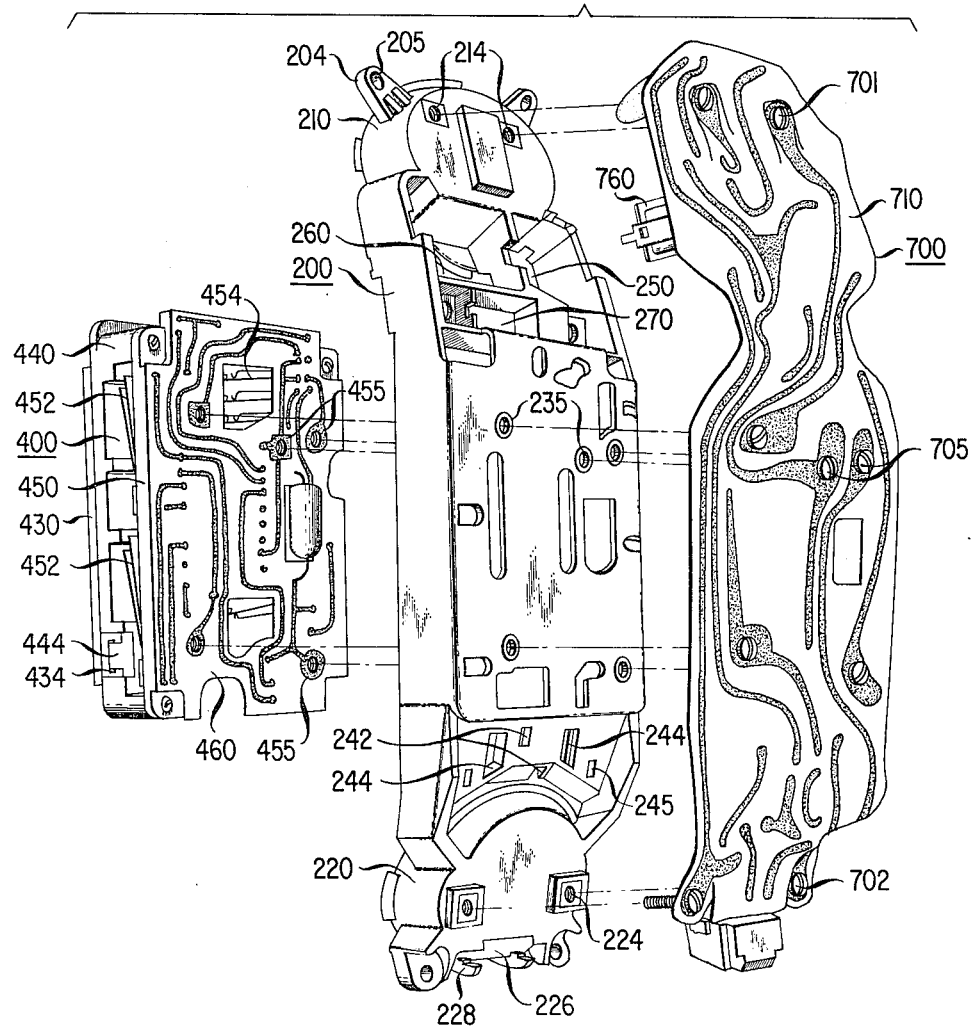
FIG. 8 is an exploded perspective view looking from the rear showing the flexible circuit, chassis, and dial separated from one another.

Turning now to FIGS. 4 and 8, the speech network of the telephone set is incorporated in the printed circuit assembly 700 which includes a flexible printed circuit 710. The receiver 310 is electrically connected to the speech network by a pair of screws 701, the heads of which engage appropriate conductive paths on the network printed circuit 710 and the shafts of which pass through holes 711 in these conductive paths and thread into the eyelets 214 in the bottom of the receiver cup portion 210 of the chassis 200. Similarly, the transmitter 620 is electrically connected to the speech network by a pair of screws 702, the heads of which engage appropriate conductive paths on the network printed circuit 710 and the shafts of which pass through holes 712 in these conductive paths and thread into the eyelets 224 in the bottom of the transmitter cup portion 220.

As seen most clearly in FIG. 4, in between the receiver cup portion 210 and the transmitter cup portion 220, the chassis 200 includes a rectangular cavity 230, the cavity being of a size to closely conform to the dial assembly 400. The dial assembly 400 is basically the same as that disclosed in U.S. Pat. No. 3,316,357 issued to J. H. Ham, Jr., J. F. Ritchey, and W. R. Tolman on Apr. 25, 1967. It differs from the dial assembly disclosed in the aforementioned patent in that it is significantly smaller in size and it includes a light guide 430 having an array of holes through which the pushbuttons 410 protrude. The light guide 430, which underlies the faceplate 420 (FIG. 3), cooperates with light emitting diodes (not shown) in the manner disclosed in U.S. Pat. No. 3,774,021 issued to B. H. Johnson on Nov. 20, 1973 to illuminate the pushbuttons 410. Further, power for the light emitting diodes is advantageously provided by conductive paths incorporated in a conductive sheet (not shown) underlying the light guide 430 and disposed about the pushbuttons 410, the conductive sheet also serving to provide static discharge protection for the dial circuitry.

A cover plate 440 underlying the light guide 430 has a pair of integral locating pins 442 upstanding therefrom that are respectively accommodated by holes in tabs 432 of the light guide to align the light guide with respect to the cover plate. These same pins are accommodated by holes in tabs 422 (FIG. 3) in the faceplate 420 to align the faceplate with respect to the light guide. This alignment serves to prevent rubbing of the pushbuttons 410 against the faceplate 420 and the light guide 430, abrasion of the latter resulting in reduced illumination of the pushbuttons.

The cover plate 440 also has a pair of integral spring latching fingers 444 (only one of which is shown) upstanding therefrom that are accommodated within openings 434 (only one of which is shown) in the light guide 430. The latching fingers 444 include laterally extending catches at the ends thereof that engage shoulders in the openings 434 to secure the light guide 430 to the cover plate 440 without the use of fasteners.

Referring now also to FIG. 8, the dial assembly 400, like the dial assembly disclosed in the Ham et al patent, includes a base member 450 to which a plurality of frequency selecting switches 452 and a common switch 454 are mounted, and the contacts of the switches include tangs that are soldered to conductive paths on a printed circuit 460. However, the dial assembly 400 differs from the dial assembly of the Ham et al patent in that the base member 450, which is molded from a dielectric material, has a plurality of internally threaded eyelets 455 secured thereto. The eyelets 455 are arranged in registration with appropriate conductive paths on the printed circuit 460, which is a double-sided semiflexible printed circuit, and the eyelets are either crimped over openings in these conductive paths or overlie the openings in the conductive paths. The eyelets 455 are also in registration with eyelets 235 secured to the bottom of the rectangular cavity 230 in the chassis 200. Finally, the eyelets 455 are in registration with holes 715 in conductive paths of the network printed circuit 710 of the printed circuit assembly 700.

Thus with the dial assembly 400 positioned within the cavity 230 in the chassis 200, the dial circuitry on the printed circuit 460 is electrically connected to the network circuitry on the printed circuit 710 by screws 705, the heads of which engage the appropriate conductive paths on the printed circuit 710 and the shafts of which extend through holes 715 in these conductive paths and eyelets 235 in the cavity 230 and thread into the eyelets 455 in the dial assembly 700. This electrical interconnection also serves to mechanically secure the dial assembly 400 to the chassis 200.

As seen most clearly in FIG. 4, secured to the chassis 200 between the dial assembly 400 and the transmitter assembly 600 is the recall button assembly 500 which comprises the pushbutton 510, a retainer 520, and a biasing spring 530. The forward end of the bushbutton 510 is accommodated by an opening 522 in the retainer 520 while the rearward end of the pushbutton includes a pair of actuator arms 512 that are respectively accommodated by openings 242 extending through the chassis 200. The biasing spring 530, which has one end positioned within a circular recess in the bottom of the pushbutton 510 and the other end positoned within a circular recess 243 in the chassis 200, acts to deflect the pushbutton away from the chassis. The outward movement of the pushbutton 510 is, however, limited by the engagement of the actuator arms 512 with the underside of a body portion 523 of the retainer 520.

A pair of integral spring legs 524 of the retainer 520 straddle the body portion 523, and the spring legs each have a catch, consisting of a laterally extending finger, at the end thereof. The catches extend into openings 244 in the chassis 200 and snap mount to ledges on the underside of the openings. The body portion 523 is held against the chassis 200 to secure the retainer 520 and thereby the recall button assembly 500 to the chassis.

A recall switch 720, dip-soldered to the network printed circuit 710, is snap-mounted to the underside of the chassis 200 beneath the recall button assembly 500. The recall switch 720, like the retainer 520, includes a pair of integral spring legs 721, each of which has a catch consisting of a laterally extending finger at the end thereof. The catches extend into openings 245 in the chassis 200.

The switch 720 also includes a pair of short spring contacts 724 that respectively overlie a pair of long spring contacts 725, the long spring contacts being biased against the short spring contacts to provide normally closed contact pairs. The long spring contacts 725 underlie the openings 242 in the chassis 200, and therefore when the pushbutton 510 of the recall button assembly 500 is depressed, actuator arms 512 of the pushbutton deflect the long spring contacts away from the short spring contacts 724 to open the contact pairs.

Electrically connected to the end of the network printed circuit 710 adjacent to the recall switch 720 is a jack 730 of the type disclosed in U.S. Pat. No. 3,850,497 issued to C. L. Krumreich, A. E. Mulbarger, Jr. and S. W. Walden on Nov. 26, 1974. Like the jack disclosed in the aforementioned patent, the contact springs of the jack 730 are joined to insulated lead wires, and it is the ends of these wires that are dip-soldered to the network printed circuit 710. The jack 730 differs from the jack disclosed in the Krumreich et al patent in that it includes an enclosure 732 that has a flange 734 extending from each side. The portion of the enclosure 732 behind the flanges 734 is accommodated within a recess 226 in the underside of the transmitter cup portion 220 of the chassis 200, while the flanges themselves are accommodated within slots in ribs 228 straddling the recess. The flanges 734 include ridges that snap into recesses in the ribs 228 to secure the jack to the chassis 200.

The only other components electrically connected to the network printed circuit 710 that are also secured to the chassis 200 are an inductor 750 and a transformer 760, the terminals of which are dip-soldered to the printed circuit. The inductor 750 and transformer 760 are respectively accommodated within openings 250 and 260 in the portion of the chassis 200 between the dial cavity 230 and the receiver cup portion 210. The walls defining the opening 250 have a pair of opposed notches 252 formed therein and the inductor 750 includes a pair of metal tabs 752 that are bent over into the notches to secure the inductor to the chassis 200. In a like manner, the walls defining the opening 260 have a pair of opposed notches 262 formed therein and the transformer 760 has a pair of metal tabs 762 that are bent over into the notches to secure the transformer to the chassis 200.

Alternatively, the side walls of the inductor 750 and the transformer 760 may be provided with obliquely extending spring arms and laterally extending tabs (one of each of which is shown on the inductor 750). With this arrangement, the spring arms respectively snap into recesses (not shown) in the sides of the walls of the openings 250 and 260, while the lateral tabs engage the undersides of the walls to secure these components in place.

The chassis 200 also includes an opening 270 adjacent to the openings 250 and 260 that underlies the opening 124 (FIG. 1) in the deck 120. The openings 270 and 128 combine to permit the handset to be modified to provide weak speech or hard of hearing service. More specifically, the printed circuit assembly 700 may be modified to include amplification of either the outgoing or incoming speech signals and a thumb wheel 770 (shown in phantom in FIG. 4) for controlling the volume of the amplification. The thumb wheel 770 is supported within the opening 270 in the chassis 200 and extends into the opening 128 in the deck 120 when the chassis is secured to the deck. The cover plate (not shown) that overlies the cavity 123 in the deck 120 is then provided with a comparable opening whereby the thumb wheel is accessible to the telephone user.

From the foregoing it is seen that the receiver assembly 300, dial assembly 400, recall button assembly 500, transmitter assembly 600, and printed circuit assembly 700 are each separable from the chassis 200 independent of the other. It is therefore clear that this arrangement greatly simplifies assembly, maintenance, and repair of the telephone set.

What is claimed is:

1. In a telephone set, an assembly comprising:
    a chassis on which components of the telephone set are supported, the chassis having a button-receiving opening extending therethrough;
    a switch assembly positioned on one side of the chassis, the switch assembly including:
        a pair of contact members, at least one of which is movable and extends into juxtaposition with the button-receiving opening of the chassis;
        a structure on which the contact members are mounted having a pair of spring legs, each spring leg having a catch that engages the chassis to secure the switch assembly to the one side of the chassis; and
    a button assembly positioned on the outer side of the chassis and mounted to the chassis independent of the switch assembly, the button assembly including:
        a pushbutton having a dependent actuator portion that extends through the button-receiving opening in the chassis for engaging the movable contact member of the switch assembly; and
        a retainer having an opening through which the upper end of the pushbutton extends, the retainer having a pair of spring legs and each spring leg having a catch that engages the chassis to secure the retainer and thereby the button assembly to the other side of the chassis.

2. An assembly as in claim 1 further including a printed circuit extending along the one side of the chassis, the switch assembly being joined to the printed circuit, electrically connected to conductive paths on the printed circuit, and situated between the printed circuit and the chassis, the switch assembly serving to snap mount the printed circuit to the chassis.

3. An assembly as in claim 2 further including:
    a dial including a base member and a printed circuit contiguous to the base member, the base member having a plurality of internally threaded terminals located in registration with openings in conductive paths on the printed circuit;
    a dial-receiving cavity in the other side of the chassis, the bottom of the cavity having a plurality of eyelets that align with the terminals in the base member of the dial when the dial is positioned in the dial-receiving cavity;

the printed circuit of the one side of the chassis having openings in conductive paths thereon that are in registration with the eyelets in the chassis when the printed circuit is mounted on the chassis; and a plurality of fasteners for securing the dial on the other side of the chassis to the chassis, the fasteners engaging the conductive paths on the printed circuit on the one side of the chassis and extending through the openings therein and the eyelets in the chassis and threading into the terminals of the dial to electrically connect the conductive paths to the terminals.

4. An assembly as in claim 1 wherein the chassis is contained within a telephone handset including a housing enclosing the chassis, and all of the components of the handset are mounted on the chassis independent of the housing.

5. A dial-in-handset telephone comprising:

a unitary rigid chassis including transducer-receiving cup portions at the extremities thereof and a dial-receiving cavity in the middle thereof, the transducer-receiving cup portions and the dial-receiving cavity all being open to a first side of the chassis;

a housing enclosing the chassis;

means for respectively mounting a transmitter and a receiver in the transducer-receiving cup portions independent of the housing;

a flexible printed circuit extending along the second side of the chassis, the printed circuit having a plurality of components joined thereto and electrically connected to conductive paths thereon, several of the components being supported on the chassis and the supported components all being detachably mounted on the chassis whereby the printed circuit is readily separable from the chassis; and a dial separate from the printed circuit positioned within the dial-receiving cavity of the chassis and secured to the chassis by fasteners that also detachably secure the printed circuit to the chassis and serve to electrically connect the dial to conductive surfaces on the printed circuit.

* * * * *